US008967035B2

(12) United States Patent
Subrt

(10) Patent No.: US 8,967,035 B2
(45) Date of Patent: Mar. 3, 2015

(54) SENSOR COUPLER FOR PISTON-CYLINDER ASSEMBLY

(75) Inventor: Michael C. Subrt, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 471 days.

(21) Appl. No.: 13/479,481

(22) Filed: May 24, 2012

(65) Prior Publication Data

US 2013/0312601 A1 Nov. 28, 2013

(51) Int. Cl.
*F15B 15/28* (2006.01)

(52) U.S. Cl.
USPC .................................. 92/5 R; 91/1

(58) Field of Classification Search
CPC .................................... F15B 15/2892
USPC ................... 92/5 R; 91/1; 73/866.5
See application file for complete search history.

(56) References Cited

U.S. PATENT DOCUMENTS

| | | | | |
|---|---|---|---|---|
| 4,632,018 A * | 12/1986 | Lymburner | ...................... | 92/5 R |
| 4,839,591 A * | 6/1989 | Nomura et al. | .................. | 92/5 R |
| 5,182,979 A * | 2/1993 | Morgan | ........................... | 92/5 R |
| 5,182,980 A * | 2/1993 | Greer | ............................... | 92/5 R |
| 5,455,509 A * | 10/1995 | Semura et al. | .................. | 92/5 R |
| 5,780,743 A | 7/1998 | Morgan | | |
| 5,856,745 A | 1/1999 | Morgan | | |
| 6,834,574 B2 * | 12/2004 | Neumann | ........................... | 91/1 |
| 6,941,827 B2 | 9/2005 | Krone | | |
| 7,047,865 B2 * | 5/2006 | Neumann | ........................... | 91/1 |
| 7,552,671 B2 * | 6/2009 | Neumann | ........................... | 91/1 |
| 8,240,240 B2 * | 8/2012 | Fitzkee et al. | ..................... | 91/1 |
| 2010/0223982 A1 | 9/2010 | Siraky | | |

FOREIGN PATENT DOCUMENTS

| | | |
|---|---|---|
| DE | 3119829 A1 | 12/1982 |
| DE | 102005048964 A1 | 4/2007 |
| EP | 695879 A1 | 2/1996 |
| JP | 9229020 A | 9/1997 |
| JP | 2011521263 A | 7/2011 |

* cited by examiner

*Primary Examiner* — Thomas E Lazo

(57) ABSTRACT

A sensor coupler adapted to operatively connect a sensor to a piston-cylinder assembly. The sensor coupler includes a first end member and a second end member. The first end member is disposed on a port of the piston-cylinder assembly, in communication with the sensor, and the second end member is disposed in a cylinder chamber of the piston-cylinder assembly. Further, one or more cables are extending between the first end member and the second end member. The one or more cables are configured to transmit signals indicative of a position of a piston in the piston-cylinder assembly to the sensor. The sensor coupler further includes a biasing member to connect the first end member and the second end member.

20 Claims, 2 Drawing Sheets

SENSOR COUPLER FOR PISTON-CYLINDER ASSEMBLY

TECHNICAL FIELD

The present disclosure relates to a position sensing arrangement for a piston-cylinder assembly, and more particularly to a sensor coupler operatively connecting a sensor in the sensing arrangement of the piston-cylinder assembly.

BACKGROUND

Hydraulic actuators are employed in numerous industries in a wide variety of machines and applications, converting pressurized hydraulic fluid into linear work and motion, via a motion of a piston within a cylinder. Such actuators may be employed to move the linkages and work tools of various earthmoving machines, such as excavators and loaders. For example, hydraulic cylinders may be positioned between boom, stick and bucket of a hydraulic excavator, allowing the bucket to be raised, lowered, and tilted between various positions as part of ordinary operations. These actuators may also be employed in steering mechanisms of various machines, for example, between the front and rear frames of loaders and motor graders to control articulation, or to control wheel position in off-highway trucks.

It may be desired to determine a position of the piston in the cylinder of the piston-cylinder assembly. Typically, this is achieved by using a sensor with the piston-cylinder assembly. In certain cases, the hydraulic fluid in the piston-cylinder assembly is at a pressure which may be detrimental to the sensor. Therefore, it may be desired that the sensor is positioned outside the piston-cylinder assembly. U.S. Pat. No. 6,834,574 discloses a fluid-pressure actuated piston-cylinder assembly having a sensor capable of reading at least one indicia marking on a piston rod in order to determine the movement and specific location of the piston rod relative to cylinder. The sensor is housed within a sealing gland that is incorporated within the piston-cylinder assembly, and is isolated from the internal fluid pressure and external elements.

SUMMARY

In one aspect, the present disclosure provides a sensor coupler adapted to operatively connect a sensor to a piston-cylinder assembly. The sensor coupler includes a first end member and a second end member. The first end member is disposed on a port of the piston-cylinder assembly, in communication with the sensor, and the second end member is disposed in a cylinder chamber of the piston-cylinder assembly. Further, one or more cables are extending between the first end member and the second end member. The one or more cables are configured to transmit signals indicative of a position of a piston in the piston-cylinder assembly to the sensor. The sensor coupler further includes a biasing member to connect the first end member and the second end member.

In another aspect, the present disclosure provides a position sensing arrangement for the piston-cylinder assembly. The position sensing arrangement includes the sensor and the sensor coupler partially disposed in the port of the piston-cylinder assembly. The sensor coupler includes the first end member and the second end member. The first end member is placed above the port, and the second end member is disposed in the port of the piston-cylinder assembly. Further, the one or more cables are extending between the first end member and the second end member. The one or more cables are configured to transmit the signals indicative of the position of the piston in the piston-cylinder assembly to the sensor. The sensor coupler further includes the biasing member to connect the first end member and the second end member.

In yet another aspect, the present disclosure provides a piston-cylinder assembly including a cylinder, and a piston adapted to linearly move in the cylinder. The piston rod defines a rod side in the cylinder. A port is provided in the rod side of the cylinder. The piston-cylinder assembly includes the sensor and the sensor coupler partially disposed in the port of the piston-cylinder assembly. The sensor coupler includes the first end member and the second end member. The first end member is placed above the port, and the second end member is disposed in the port of the piston-cylinder assembly. Further, the one or more cables are extending between the first end member and the second end member. The one or more cables are configured to transmit the signals indicative of the position of the piston in the piston-cylinder assembly to the sensor. The sensor coupler further includes the biasing member to connect the first end member and the second end member.

Other features and aspects of this disclosure will be apparent from the following description and the accompanying drawings.

DETAILED DESCRIPTION

Figure 1:
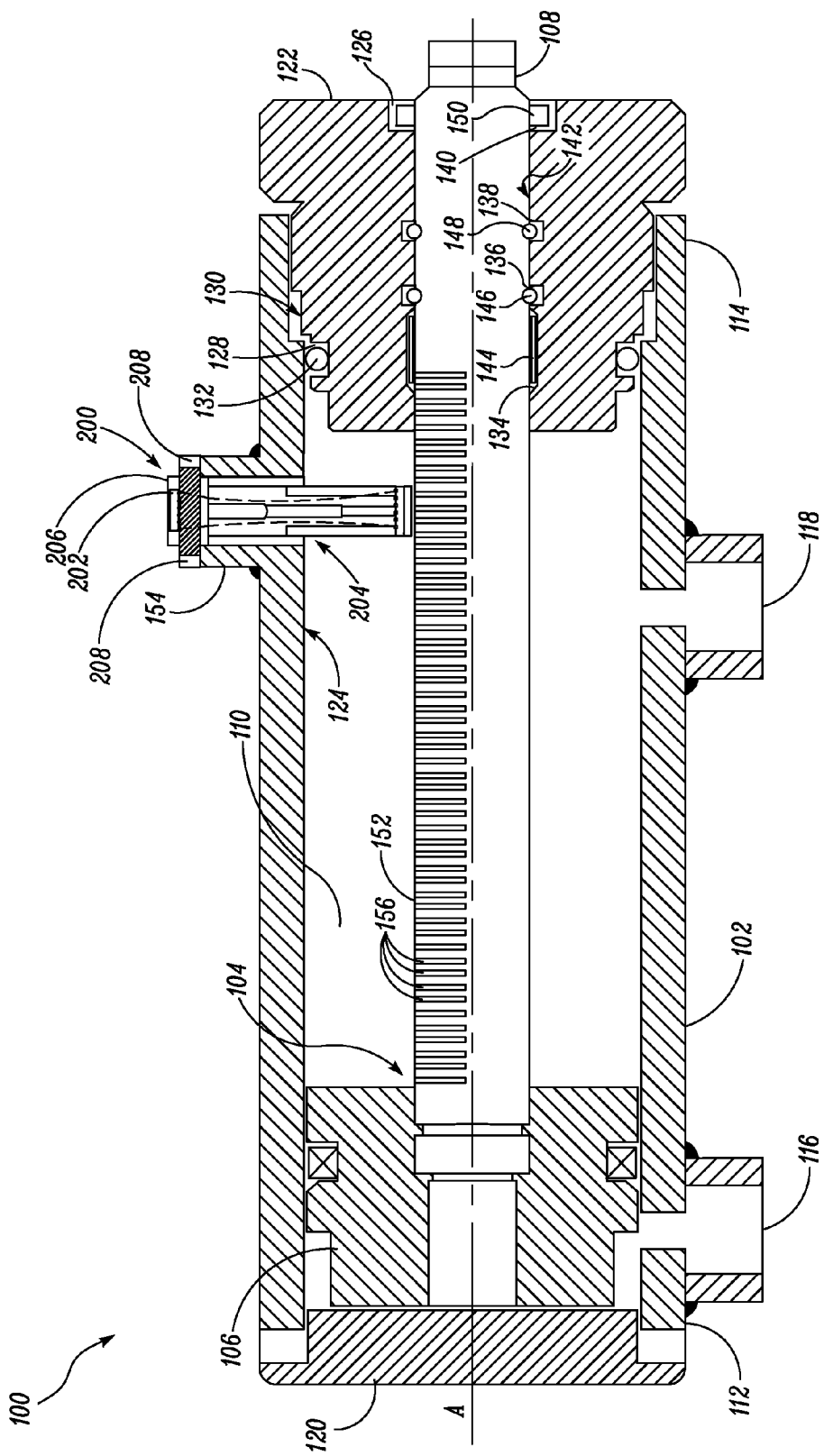
FIG. 1 illustrates a sectional view of a piston-cylinder assembly, according to an embodiment of the present disclosure.

The present disclosure relates to a position sensing arrangement for a piston-cylinder assembly. The present disclosure will now be described in detail with reference being made to the accompanying drawings. FIG. 1 illustrates a sectional view of a piston-cylinder assembly 100, according to an exemplary embodiment of the present disclosure. As illustrated in FIG. 1, the piston-cylinder assembly 100 includes a cylinder 102, and a piston assembly 104 disposed within the cylinder 102. The piston assembly 104 includes a piston 106 and a piston rod 108.

It may be apparent to a person having ordinary skill in the art that the cylinder 102 may provide a cylinder chamber 110 extending between two opposing ends, a first end 112 and a second end 114. The cylinder chamber 110 may be adapted to receive the piston 106. The piston 106 may divide the cylinder chamber 110 into two sections, having a first cylinder port 116 and a second cylinder port 118 provided at the first end 112 and the second end 114, respectively. The piston 106 is adapted to linearly reciprocate within the cylinder chamber 110, relative to the cylinder 102, along an axis A based on which section of the cylinder chamber 110 is pressurized.

Further, the first end 112 may be closed by an end cap 120 and the second end 114 may be adapted to receive a gland member 122. The gland member 122 may be sealingly engaged with an inner wall 124 of the cylinder 102. In an embodiment, the inner wall 124 of the cylinder 102 may include threads for engagement with complementary threads provided on the gland member 122. The gland member 122 has a rod opening 126 therein, such as a longitudinal throughbore, to slidably receive the piston rod 108.

Moreover, a seal groove 128 may also be provided along an outer surface 130 of the gland member 122, and a seal 132 may be provided therein for ensuring a sealing engagement between the gland member 122 and the inner wall 124 of the cylinder 102. Additionally, grooves 134, 136, 138, 140 may be provided along an internal wall 142 of the gland member 122 for seating a wear ring 144, a buffer seal 146, a rod seal 148, and a wiper seal 150, respectively. It may be contemplated that the rod seal 148 and the wiper seal 150 may be configured to engage an outer surface 152 of the piston rod 108, to keep the area along the piston rod 108 between the seals 148, 150 free from debris or other substances that may interfere with operation of the piston-cylinder assembly 100.

According to an embodiment, the piston-cylinder assembly 100 further includes a port 154 positioned proximate to the second end 114 of the cylinder 102. The port 154 may be an opening, such as a cylindrical throughbore, within the cylinder 102 that opens into the cylinder chamber 110. The port 154 may be disposed in a radial direction relative the cylinder chamber 110, as illustrated in FIG. 1. The port 154 is adapted to receive a position sensing arrangement 200, for example, but not limited to, an optical position sensing apparatus, that is able to detect a position of the piston 106 relative to the cylinder 102. Additionally, the position sensing arrangement 200 may also detect a direction of motion of the piston 106 relative to the cylinder 102.

Further, a plurality of detectable features 156, such as markings or encodings, may be provided in a substantially predetermined rotational orientation along the length of the piston rod 108. It should be appreciated that the piston rod 108 may be arranged in a rotational orientation relative the port 154, so that the detectable features 156 are substantially rotationally aligned with the port 154.

According to an embodiment, the position sensing arrangement 200 may include a sensor 202, and a sensor coupler 204 to operatively connect the sensor 202 in the piston-cylinder assembly 100. In an embodiment of the present disclosure, the sensor coupler 204 may be sited on and partially received in the port 154, and the sensor 202 may be mounted on the sensor coupler 204.

As illustrated in FIG. 1, the sensor 202 is positioned substantially outside the cylinder 102, and enclosed within a sensor housing 206. In an embodiment, the position sensing arrangement 200 may further include a pair of flanges 208 to secure the sensor coupler 204 on the port 156. The flanges 208 may be fastened with the port 156 using any well-known fastening means, such as bolts, rivets, etc. Alternatively, the position sensing arrangement 200 may include a mounting ring to mount the sensor coupler 204 on the port 154.

The sensor 202 may be operable to detect one or more detectable features 156, and responsively generate a signal indicative of the position of the piston 106 as a function of the one or more detectable features 156. The sensor 202 may determine the position of the piston 106, represented as a reading via a micro-controller or the like, for an operator or an autonomous controller of the machine. Alternatively, the sensor 202 may be used as a transducer, to convert the measurement directly into an output, which in turn may be utilized as a feedback control for the piston-cylinder assembly 100.

In an embodiment, the position sensing arrangement 200 may utilize a single or plurality of sensors 202 for the purpose. The sensor 202 may be of any type, for example, an optical sensor, a magnetic sensor, a microwave radio frequency sensor, an ultra-sonic sensor, etc. Further, the detectable features 156 may be in the form of encodings, indentations, or the like, based on the type of the sensor 202 employed.

Figures 2, 3:
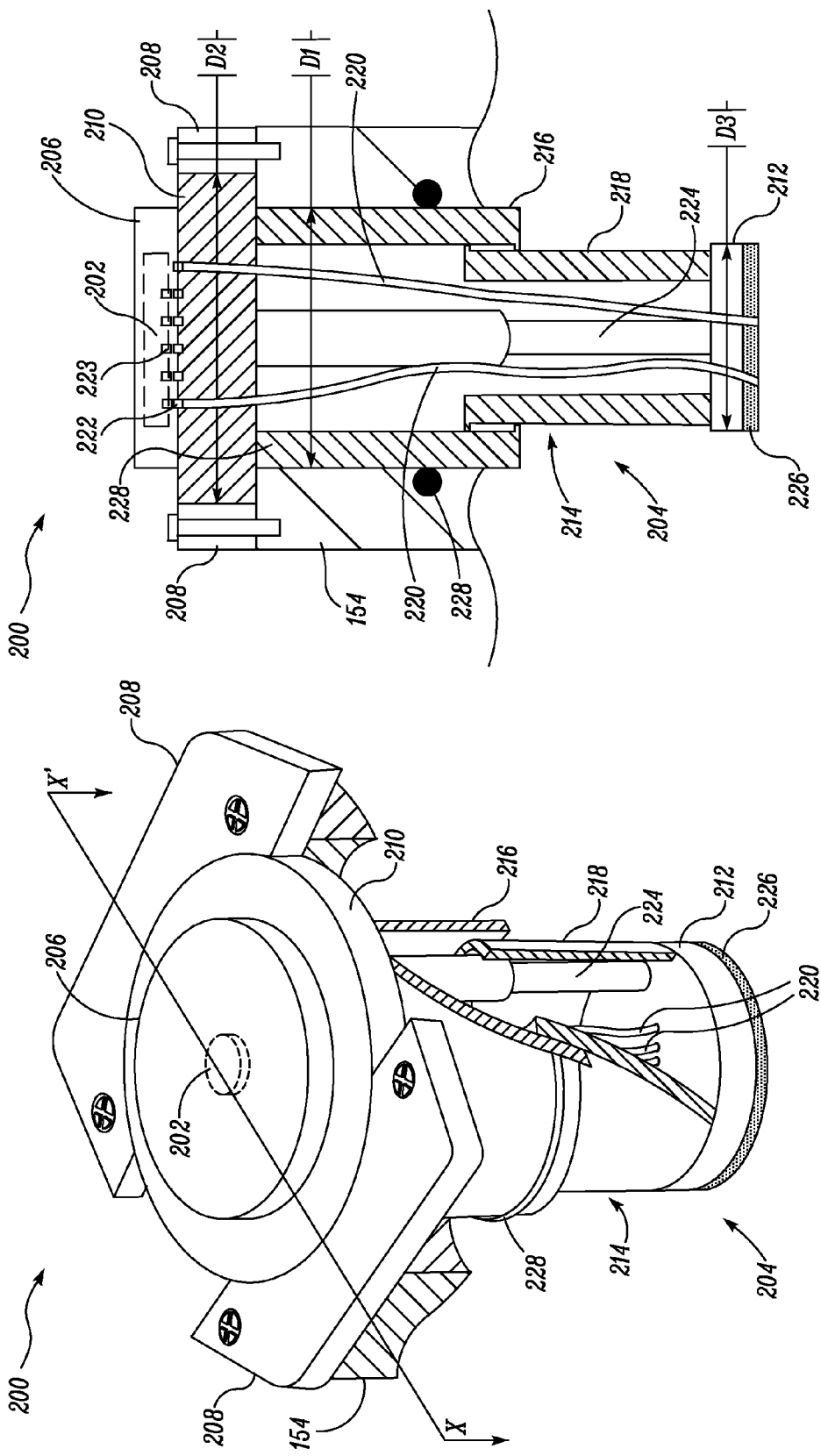
FIG. 2 illustrates a perspective view of a position sensing arrangement, according to an embodiment of the present disclosure.
FIG. 3 illustrates a cross-sectional view of the position sensing arrangement about XX', according to an embodiment of the present disclosure.

FIGS. 2 and 3 illustrate a perspective view and a sectional view of the position sensing arrangement 200, respectively. As illustrated in FIG. 2, the sensor coupler 204 may include a first end member 210 and a second end member 212. The first and the second end members 210, 212 may be made of sintered alumina, or any other ceramic material. According to an exemplary embodiment, the first and the second end members 210, 212 may be in a shape of a circular disc. However it may be contemplated that the first and the second end members 210, 212 may have any cross-sectional shape, for example, square, polygonal, elliptical etc.

According to an embodiment, the sensor 202 may be mounted on the first end member 210 of the sensor coupler 204. The sensor 202 and/or the sensor housing 206 may be attached to the first end member 210 by any method known in the art, such as, but not limited to, mechanical coupling/fasteners, adhesives, welding, brazing, soldering, or the like.

As illustrated in FIG. 3, the port 154 may have an inner diameter D1. The first end member 210 and the second end member 212 have diameters D2 and D3, respectively. In an embodiment, D2 may be larger than D1, and D1 may be larger than D3. This configuration may enable the first end member 210 to be placed over the port 154. Further, the second end member 212 may be disposed inside the port 154, in vicinity of the piston rod 108. Thus, in the position sensing arrangement 200, the sensor coupler 204 may be partially disposed within the port 154.

The sensor coupler 204 may include also a telescopic enclosure 214. The telescopic enclosure 214 may be extending between the first end member 210 and the second end member 212. In an exemplary embodiment, the telescopic enclosure 214 may include an upper member 216 adapted to telescopically receive a lower member 218, and thus enable to expand or collapse. For the purpose of illustration, in FIG. 2, the upper member 216 and the lower member 218 are partially broken in order to show various other components of the sensor coupler 204.

As illustrated, the sensor coupler 200 may further include one or more cables 220 extending between the first end member 210 and the second end member 212. The cables 220 are configured to transmit various signals back and forth between the sensor 202 and the detectable features 156, provided on the piston rod 108. The cables 220 may be insulated and sealingly enclosed by the telescopic enclosure 214 to avoid any interference due to the external or internal factors. The cables 220 may be embedded in the first second end member 210 at terminals 222, which may be communicably connected to corresponding terminals 223 in the sensor 202 for exchange of the signals.

In an embodiment, the one or more cables 220 may be one of electrical cables, fiber optic cables, or ultra-sonic cables, based on the type of sensor 202 used. In an exemplary embodiment, the cables 220 may include fiber optic cables to transmit optical signals corresponding to an optical sensor 202, to detect the detachable features 156 provided on the piston rod 108. Alternatively, in case a microwave or ultra-sonic sensor 202, the cables 220 may transmit microwaves or ultra-sonic waves respectively, and the sensor 202 may determine the position of the piston 106 based on a measured time interval corresponding to reflected waves. Further, in case of a magnetic sensor 202, the cables 220 may be made of ferrous material with high magnetic permeability, to create a magnetic circuit with the detectable features 156, and measure the inductance of the circuit, indicative of the position of the piston rod 108.

As illustrated in FIG. 2, the sensor coupler 204 includes one or more biasing members 224. The biasing member 224 may connect the first end member 210 and the second end member 212. According to an embodiment of the present disclosure, the biasing member 224 may include one or more spring loaded telescopic shafts that are adapted to expand or collapse based in response to forces on second end member 212.

During operation, the piston rod 108 may undergo displacements transverse to the axis A due to vibration and pressure fluctuations. The biasing member 224 may provide a contact force so as to maintain contact between the second end member 212 and the outer surface 152 of the piston rod 108. Further, in an embodiment, the biasing member 224 may be configured to dampen the shocks that are transmitted from the piston rod 108 to the sensor 202, in the position sensing arrangement 200. It may be apparent to a person having ordinary skill in the art that, the telescopic enclosure 214 may be adapted to expand or collapse along with the biasing member 212, in the sensor coupler 204.

The sensor coupler 204 may further include a wear seal 226 disposed at the second end member 212 of the sensor coupler 204 to provide a durable contact with the outer surface 152 of piston rod 108. The wear seal 226 may provide a resilient contact between the second end member 212 and the outer surface 152 of piston rod 108. In an embodiment, the wear seal 226 may include holes (not shown) for the cables 220, for example, the fiber-optic cables to pass through. Further, the wear seal 226 may protect the second end member 212 from any wear due to relative movement between the second end member 212 and the piston rod 108. In an embodiment of the present disclosure, the wear seal 226 may be made of any material, for example, rubber, synthetic resins, friction fibers, or the like.

In an embodiment, the sensor coupler 204 may also include a hydraulic pressure seal 228 to sealingly engage the first end member 210 inside the port 154. The hydraulic pressure seal 228 may be manufactured of any one of a bronze filled polytetrafluoroethylene, polyurethane, nitrile rubber, silicone rubber, etc. The hydraulic pressure seal 228 may preclude the movement of fluid from the cylinder chamber 110 into the sensor 202.

In an embodiment, the sensor 202 may be configured to measure the position of the piston 106 based on a time interval for the signals to travel back and forth between the sensor 202 and the detectable features 156 on the piston rod 108. Alternatively, in an embodiment, when the detectable features 156 may be in form of encodings, with each distinct encoding corresponding to a unique position of the piston 106, the sensor 122 may be configured to interpret the signals reflected back from the distinct encodings.

INDUSTRIAL APPLICABILITY

The industrial applicability of the apparatus and system for determining the position of the piston 106 in the piston-cylinder assembly 100, described herein will be readily appreciated from the foregoing discussion. Machines using such piston-cylinder assembly 100 may be found in a variety of industries, such as, mining, construction, agriculture, waste management, material handling and transportation. It may be contemplated that the piston-cylinder assembly 100 may be employed as a linear hydraulic actuator in machines, such as, a loader, a compactor, a buncher, an excavator, a tractor, a reclaimer, a scraper etc.

Conventionally, a position of a piston in a piston-cylinder assembly is determined using a sensor positioned in a gland member of the piston-cylinder assembly. The sensor is isolated from the high pressure inside a cylinder of the piston-cylinder assembly, by using a plurality of seals. This may safeguard the sensor from the high pressure inside the cylinder but might not be sufficient against the transverse movement of the piston rod due to pressure fluctuation inside the cylinder or side forces to the piston-cylinder assembly.

The piston-cylinder assembly 100 of the present disclosure utilizes the sensor coupler 204 which acts as a coupling device for mounting the sensor 202 outside the cylinder chamber 110, and still determines the position of the piston 106. The sensor coupler 204 may thus allow the sensor 122 to be isolated from the high pressure inside the cylinder chamber 110. Further, the sensor coupler 204 enables the position sensing arrangement 120 to be retro-fittable, and therefore allow to possibly employing different types or sizes of sensors 122.

In the piston-cylinder assembly 100, the sensor coupler 204 is disposed in the port 154 in contact with the piston rod 108 at the second end member 212 through the wear seal 226. The cables 220, in the sensor coupler 204, may transmit the signals from the sensor 122 to the piston rod 104 and back. As described above, the biasing member 224 may provide a contact force from the second end member 212 to the outer surface 152 of the piston rod 108. Therefore, the biasing member 224 may helps to maintain a continuous contact, while the piston rod 108 is extending or retracting inside the cylinder chamber 110. Moreover, a transverse movement of the piston rod 108 due to the pressure fluctuation and/or vibrations inside the cylinder chamber 110 may be also absorbed by the biasing member 224 by expanding or collapsing in the sensor coupler 204.

Further, the telescopic enclosure 214 may protect the cables 220 against any leakage of pressurized fluid from the cylinder chamber 110. The telescopic enclosure 214 is adapted to collapse or expand with the biasing member 224, and therefore protect cables 220. The wear seal 226 may provide a durable contact between the second end member 212, of the sensor coupler 204, and the piston rod 108. The flange 208 may securely mount the sensor coupler 204 in the piston-cylinder assembly 100. Further, the hydraulic pressure seal 228 may avoid any possible leakage of the fluid from the cylinder chamber 110, and thus protect the sensor 202.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended and will be appreciated that the specification and examples be considered as exemplary only, with a true scope being indicated by the following claims and their equivalents.

What is claimed is:

1. A sensor coupler adapted to operatively connect a sensor in a piston-cylinder assembly, the sensor coupler comprising:
    a first end member disposed on a port of the piston-cylinder assembly, the first end member communicably associated with the sensor;
    a second end member disposed in a cylinder chamber of the piston-cylinder assembly;
    one or more cables extending between the first end member and the second end member, the one or more cables configured to transmit a signal indicative of a position of a piston in the piston-cylinder assembly to the sensor; and at least one biasing member connecting the first end member and the second end member.

2. The sensor coupler of claim 1, wherein the one or more cables are one of an electric cable, a fiber-optic cable, or an ultra-sonic cable.

3. The sensor coupler of claim 1, wherein the biasing member is a spring-loaded telescopic shaft.

4. The sensor coupler of claim 1 further including a telescopic enclosure for the one or more cables.

5. The sensor coupler of claim 1 further including a wear seal to provide a contact between the piston rod and the second end member.

6. A position sensing arrangement for a piston-cylinder assembly, the position sensing arrangement comprising:
a sensor configured to determine a position of a piston in the piston-cylinder assembly based at least on a signal; and
a sensor coupler partially received in a port of the piston-cylinder assembly, the sensor coupler including:
a first end member disposed on the port of the piston-cylinder assembly, the first end member communicably associated with the sensor,
a second end member disposed in a cylinder chamber of the piston-cylinder assembly,
one or more cables extending between the first end member and the second end member, the one or more cables configured to transmit the signal indicative of the position of the piston in the piston-cylinder assembly, and
at least one biasing member connecting the first end member and the second end member.

7. The position sensing arrangement of claim 6, wherein the first end member and the sensor are communicably associated with each other via terminals, and wherein the terminals, in the first end member, are connected to the one or more cables.

8. The position sensing arrangement of claim 6, wherein the one or more cables are one of an electric cable, a fiber-optic cable, or an ultra-sonic cable.

9. The position sensing arrangement of claim 6, wherein the biasing member is a spring-loaded telescopic shaft.

10. The position sensing arrangement of claim 6, wherein the sensor coupler further includes a telescopic enclosure for the one or more cables.

11. The position sensing arrangement of claim 6, wherein the sensor coupler further includes a wear seal to provide a contact between the piston rod and the second end member.

12. The position sensing arrangement of claim 6 further including a hydraulic pressure seal configured to sealingly engage the sensor coupler in the port of the piston-cylinder assembly.

13. The position sensing arrangement of claim 6 further including a flange configured to secure the sensor coupler in the port of the piston-cylinder assembly.

14. A piston-cylinder assembly comprising:
a cylinder chamber;
a piston adapted to linearly move in the cylinder;
a port provided in the cylinder chamber;
a sensor configured to determine a position of the piston based at least on a signal; and
a sensor coupler partially received in the port, the sensor coupler including:
a first end member disposed on the port, the first end member communicably associated with the sensor,
a second end member disposed in a cylinder chamber of the piston-cylinder assembly,
one or more cables extending between the first end member and the second end member, the one or more cables configured to transmit the signal indicative of a position of the piston, and
at least one biasing member connecting the first end member and the second end member.

15. The piston-cylinder assembly of claim 14, wherein the piston rod includes a plurality of detectable features, and wherein the one or more cables transmit signals from the detectable features, each signal being indicative of a unique position of the piston.

16. The piston-cylinder assembly of claim 14, wherein the one or more cables are any of an electric cable, a ferrous cable, a fiber-optic cable, an ultra-sonic cable.

17. The piston-cylinder assembly of claim 14, wherein the sensor coupler further includes a telescopic enclosure for the one or more cables.

18. The piston-cylinder assembly of claim 14, wherein the sensor coupler further includes a wear seal to provide a contact between the piston rod and the second end member.

19. The piston-cylinder assembly of claim 14 further including a flange configured to secure the sensor coupler with the port.

20. The piston-cylinder assembly of claim 14 further including a hydraulic pressure seal configured to sealingly engage the sensor coupler in the port.

* * * * *